US012208628B2

(12) United States Patent
Yanase

(10) Patent No.: US 12,208,628 B2
(45) Date of Patent: Jan. 28, 2025

(54) LIQUID DISCHARGE APPARATUS

(71) Applicant: Norikazu Yanase, Kanagawa (JP)

(72) Inventor: Norikazu Yanase, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 209 days.

(21) Appl. No.: 17/944,204

(22) Filed: Sep. 14, 2022

(65) Prior Publication Data

US 2023/0109593 A1 Apr. 6, 2023

(30) Foreign Application Priority Data

Oct. 6, 2021 (JP) ................................ 2021-164674
Jul. 12, 2022 (JP) ................................ 2022-111705

(51) Int. Cl.
*B41J 25/00* (2006.01)
*B41J 11/20* (2006.01)
*B41J 25/308* (2006.01)

(52) U.S. Cl.
CPC ............. *B41J 25/006* (2013.01); *B41J 11/20* (2013.01); *B41J 25/308* (2013.01)

(58) Field of Classification Search
CPC ... B41J 3/543; B41J 2/01; B41J 19/202; B41J 11/00; B41J 25/308; B41J 23/12; B41J 25/316; D06P 5/30; B33Y 10/00
See application file for complete search history.

(56) References Cited

U.S. PATENT DOCUMENTS 4,576,490 A * 3/1986 Isobe ......................... B41J 3/54 400/322
5,134,933 A * 8/1992 Dubuit ................ B41F 15/0818 101/124
5,322,377 A * 6/1994 Asai ..................... B41J 25/3088 400/58
6,736,557 B2 * 5/2004 DeVore ................ B41J 25/3088 400/59
7,434,902 B2 * 10/2008 Baker .................... B41J 25/308 400/55
9,090,102 B2 * 7/2015 Kagami ................... B41J 3/543
(Continued)

FOREIGN PATENT DOCUMENTS

JP 11-254759 9/1999
JP 2000-282373 10/2000
(Continued)

*Primary Examiner* — John Zimmermann
(74) *Attorney, Agent, or Firm* — XSENSUS LLP

(57) ABSTRACT

A liquid discharge apparatus includes: a liquid discharge head configured to discharge a liquid in a discharge direction onto a liquid application target; a stage configured to hold and move the liquid application target in a conveyance direction orthogonal to the discharge direction, a carriage on which the liquid discharge head is mounted; a guide holding the carriage movable in a main scanning direction orthogonal to each of the discharge direction and the conveyance direction; a pair of holders respectively holding sides of the guide in the main scanning direction; and multiple eccentric cams contacting the pair of holders, the multiple eccentric cams rotatable to move at least one of the pair of holders in at least one of the conveyance direction or the discharge direction to adjust a position of the carriage or the guide.

18 Claims, 5 Drawing Sheets

(56) References Cited

U.S. PATENT DOCUMENTS

| | | | | |
|---|---|---|---|---|
| 2003/0016983 | A1* | 1/2003 | Baldwin-Garcia | B41J 3/543 400/149 |
| 2008/0259110 | A1* | 10/2008 | Korem | B41J 25/001 347/16 |
| 2008/0280028 | A1* | 11/2008 | Albrecht | B41J 3/28 118/712 |
| 2012/0320127 | A1* | 12/2012 | Kikura | B41J 25/304 347/37 |
| 2014/0020189 | A1* | 1/2014 | Weibel | B41J 3/4078 134/169 C |
| 2014/0078232 | A1 | 3/2014 | Kondo et al. | |
| 2014/0079461 | A1 | 3/2014 | Obata et al. | |
| 2014/0099148 | A1 | 4/2014 | Obata et al. | |
| 2014/0099149 | A1 | 4/2014 | Kikura et al. | |
| 2014/0099150 | A1 | 4/2014 | Matsumoto et al. | |
| 2014/0105661 | A1 | 4/2014 | Kondo et al. | |
| 2014/0253623 | A1 | 9/2014 | Nakano et al. | |
| 2015/0054898 | A1 | 2/2015 | Kondo et al. | |
| 2015/0077459 | A1 | 3/2015 | Yanase et al. | |
| 2015/0077494 | A1 | 3/2015 | Obata et al. | |
| 2015/0091971 | A1 | 4/2015 | Matsumoto et al. | |
| 2016/0031239 | A1 | 2/2016 | Yanase et al. | |
| 2018/0033456 | A1* | 2/2018 | Miyahara | G11B 5/5552 |
| 2019/0009586 | A1 | 1/2019 | Yanase et al. | |
| 2021/0283914 | A1 | 9/2021 | Yanase | |
| 2022/0055386 | A1 | 2/2022 | Yanase et al. | |

FOREIGN PATENT DOCUMENTS

| | | |
|---|---|---|
| JP | 2009-061758 | 3/2009 |
| JP | 2009-078415 | 4/2009 |
| JP | 2010-228329 | 10/2010 |
| JP | 2019-038270 | 3/2019 |

* cited by examiner

LIQUID DISCHARGE APPARATUS

CROSS-REFERENCE TO RELATED APPLICATIONS

This patent application is based on and claims priority pursuant to 35 U.S.C. § 119(a) to Japanese Patent Application No. 2021-164674, filed on Oct. 6, 2021, in the Japan Patent Office, and Japanese Patent Application No. 2022-111705, filed on Jul. 12, 2022, in the Japan Patent Office, the entire disclosure of which are hereby incorporated by reference herein.

BACKGROUND

Technical Field

Aspects of the present disclosure relate to a liquid discharge apparatus.

Related Art

A liquid discharge apparatus discharges a liquid to a predetermined area in a liquid application object while reciprocally mining the carriage mounting a liquid discharge head in a main scanning direction on a guide.

For example, the two carriages are moved in opposite directions by a pulley and an endless belt to reduce vibration generated by a movement of the carriages.

In such a liquid discharge apparatus, a positional deviation may occur such as the inclination of the carriage with respect to the liquid discharge apparatus deteriorates an inclination of the carriage with respect to the liquid application target or a main body of the liquid discharge apparatus or parallelism between the guides or between the carriages.

SUMMARY

A liquid discharge apparatus includes: a liquid discharge head configured to discharge a liquid in a discharge direction onto a liquid application target; a stage configured to hold and move the liquid application target in a conveyance direction orthogonal to the discharge direction, a carriage on which the liquid discharge head is mounted; a guide holding the carriage movable in a main scanning direction orthogonal to each of the discharge direction and the conveyance direction; a pair of holders respectively holding sides of the guide in the main scanning direction; and multiple eccentric cams contacting the pair of holders, the multiple eccentric cams rotatable to move at least one of the pair of holders in at least one of the conveyance direction Of the discharge direction to adjust a position of the carriage or the guide.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
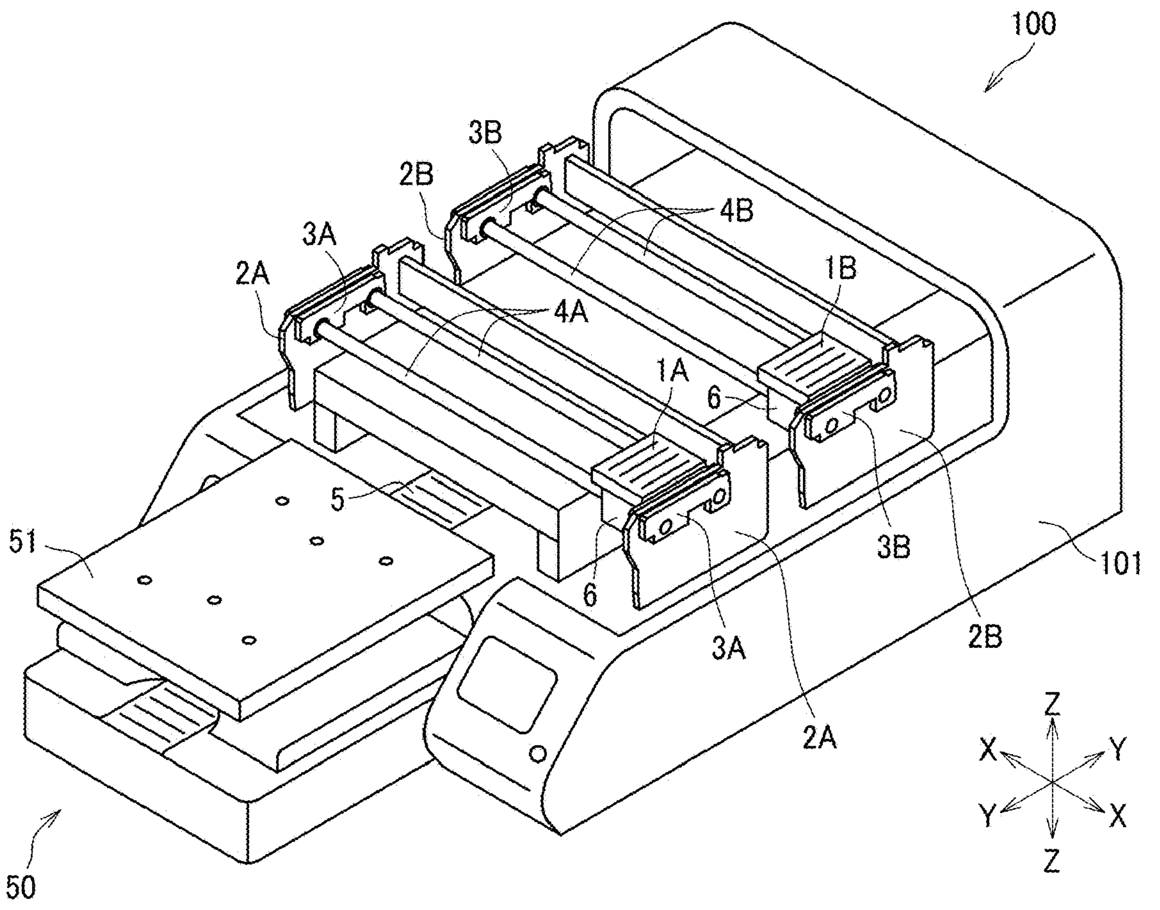
FIG. 1 is a schematic perspective view of a liquid discharge apparatus according to an embodiment of the present disclosure.

The accompanying drawings are intended to depict embodiments of the present disclosure and should not be interpreted to limit he scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a”, “an”, and “the” are intended to include the plural forms as well, unless the context clearly indicates otherwise.

Hereinafter, embodiments of the present disclosure is described below with reference to the drawings. Note that identical parts are given identical reference numerals and redundant descriptions are summarized or omitted accordingly.

FIG. 1 is a perspective view of a liquid discharge apparatus 100 according to an embodiment of the present disclosure. An X direction illustrated in FIG. 1 is a main scanning direction or a left-right direction of the liquid discharge apparatus 100. A Y direction is a conveyance direction of a fabric, a movement direction of a stage, or a front and rear direction of the liquid discharge apparatus 100. The fabric is an example of a printing target or a liquid application target.

The stage moves back and forth, and the fabric is conveyed back and forth. A Z direction is an up and down direction of the liquid discharge apparatus 100 and is a direction perpendicular to an arrangement surface of die liquid application target (fabric) of the stage. The X, Y, and Z directions are orthogonal to each other.

As illustrated in FIG. 1, the liquid discharge apparatus 100 includes a first carriage 1A and a second carriage 1B, a pair of first side plates 2A, a pair of second side plates 2B, first adjustment plates 3A as a pair of first holders, second adjustment plates 3B as a pair of second holders, first guide rods 4A as a pair of first guides, and second guide rods 4B as a pair of second guides. Hereinafter, a first carriage 1A and a second carriage 1B may also be collectively referred to as a carriage 1.

The first side plates 2A and the second side plates 2B may also be collectively referred to as a side plate 2. The first adjustment plates 3A and the second adjustment plates 3B may also be collectively referred to as an adjustment plate 3. The first guide rods 4A and the second guide rods 4B are also collectively referred to as a guide rod 4. In FIG. 1, an eccentric cam described below is omitted.

The side plates 2 are provided on both sides in the left and right direction (main scanning direction) of the liquid discharge apparatus 100. The side plates 2 are fixed to a main body 101 of the liquid discharge apparatus 100. The side plate 2 movably holds the adjustment plate 3 in the Y direction and the Z direction.

Both end sides of the guide rod 4 are respectively held by the adjustment plate 3. Each adjustment plate 3 carries two guide rods 4 in the Y direction.

The carriage 1 is movably supported on a guide rod 4 so that the carriage is movable along the guide rod 4. The carriage 1 includes multiple liquid discharge heads 6. A nozzle surface of the liquid discharge head 6 is provided on a lower surface of the liquid discharge head 6.

The liquid discharge apparatus 100 includes a main body 101*a* and a rail 5 on the main body 101 along the Y direction.

The stage 51 holds a fabric 900 (see FIG. 8) as a printing target or a liquid application target. The stage 51 is also referred to as a platen. Specifically, the fabric 900 is placed on the placement surface 51*a* of the stage 51. The placement surface 51*a* serves as a liquid application target placement surface that is a placement surface of the liquid application target (fabric 900). The placement surface 51*a* is a surface perpendicular to the direction Z. However, the placement surface 51*a* does not have to be strictly perpendicular to the direction 7.

The stage 51 moves to a downstream in the conveyance direction (right-upward direction in Y direction in FIG. 1) on (along) the rail 5. At this time (at the movement of the stage 51), a liquid discharge head 6 of the carriage 1 discharges ink as a liquid onto the fabric 900 on the stage 51, while the carriage 1 reciprocally moves on (along) the guide rod 4 in the X direction (main scanning direction). Hereinafter, the "liquid discharge head" is simply referred to as a "head". Thus, an image is formed on the fabric 900. The stage 51 can be moved in the Z direction with respect to a base portion to adjust a height of the placement surface 51*a* of the stage 51.

Figure 2:
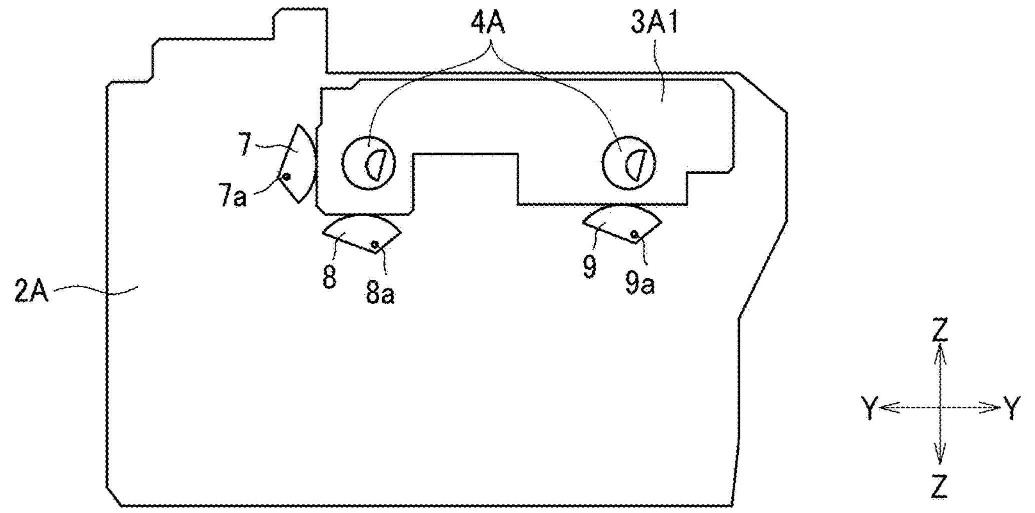
FIG. 2 is a side view of a first side plate illustrating a configuration of a left side of a first adjustment plate held by a side plate.

The liquid discharge head 6 discharges the liquid onto the fabric 900 (liquid application target) on the stage 51 in a discharge direction orthogonal to the conveyance direction (Y direction) and the main scanning direction (X direction). In FIG. 2, the discharge direction is along a vertical direction (Z direction). However, the discharge direction is not limited to the vertical, and the discharge direction may be in a horizontal direction (Y direction) and the conveyance direction may be in the vertical direction (Z direction).

The liquid discharge apparatus 100 includes the multiple carriages 1 so that the liquid discharge apparatus 100 can discharge inks of different colors onto the fabric 900 and increase a printing speed on the fabric 900 to improve the productivity of the liquid discharge apparatus 100.

Such a liquid discharge apparatus 100 may have a problem of a positional deviation of the carriage 1 with respect to the stage 51 or the main body 101 of the liquid discharge apparatus 100. That is, the carriage 1 may be inclined with respect to the stage 51 or the main body 101 of the liquid discharge apparatus 100. Also, the guide rod 4 may be inclined with respect to the main body 101 or the stage 51 so that the moving direction of the carriage 1 may not become parallel to the placement surface 51*a* of the stage 51.

Further, There is a problem that the carriages 1 are not parallel to each other in a configuration having the multiple carriages 1. There is a problem that moving directions of the carriages 1 become not parallel to each other in a configuration having the multiple carriages 1.

Therefore, the liquid discharge apparatus 100 in this embodiment includes an eccentric cam to change a position of the adjustment plate 3. A detailed configuration of the eccentric cam is described below. Since the configurations of the eccentric cams contacting with the first adjustment plate 3A and the second adjustment plate 3B are the same, only the first adjustment plate 3A is described below in the following description. In addition, among the pair of first adjustment plates 3A, the first adjustment plate 3A disposed on a left side when viewed from a lower left side in FIG. 1 is referred as a first adjustment plate 3A1. The lower left side in FIG. 1 is an upstream side in the conveyance direction of the stage 51. The first adjustment plate 3A disposed on the right side is referred to as a first adjustment plate 3A2 (see FIG. 9).

As illustrated in FIG. 2, a first eccentric cam 7, a second eccentric cam 8, and a third eccentric cam 9 are provided on the first side plate 2A. A cam surface of the first eccentric cam 7 is brought into contact with the first adjustment plate 3A1 from one side (left side) in the Y direction (see FIG. 2). The cam surfaces of the second eccentric cam 8 and the third eccentric cam 9 are brought into contact with the first adjustment plate 3A1 from below (see FIG. 2). The second eccentric cam 8 and the third eccentric cam 9 are disposed on one side (left side) and another side (right side) of the first adjustment plate 3A1 corresponding to the respective guide rods 4A.

Figure 3:
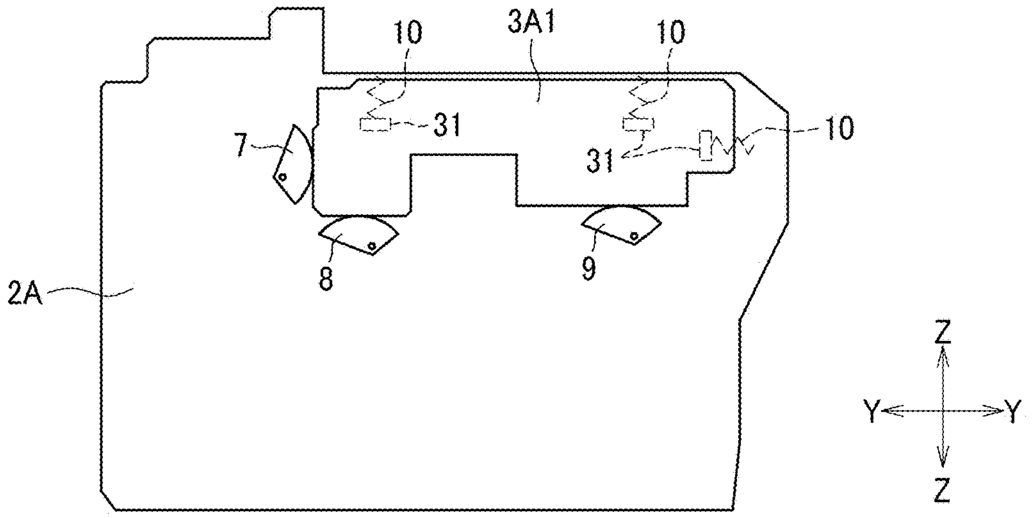
FIG. 3 is a side view of the first side plate illustrating springs to press the first adjusting plate.

As illustrated in FIG. 3, the first adjustment plate 3A1 is pressed by multiple springs 10 in directions opposite to contact directions of each eccentric cam (first eccentric cam 7, second eccentric cam 8, and third eccentric cam 9). One end of each spring 10 is fixed to the first side plate 2A, and another end of the spring 10 is fixed to the pressurized portion 31 (see FIG. 3) of the first adjustment plate 3A1. The first adjustment plate 3A1 is disposed at a position at which the first adjustment plate 3A1 contacts with each of the first eccentric cam 7, the second eccentric cam 8, and the third eccentric cam 9 due to a pressing force of the spring 10.

As illustrated in FIG. 2, the first eccentric cam 7, the second eccentric cam 8, and the third eccentric cam 9 rotate with respect to the first side plate 2A about rotation centers 7*a*, 8*a*, and 9*a*, respectively. The first eccentric cam 7 rotate itself to change its contact position with the first adjustment plate 3A1 and changes a position of the first adjustment plate 3A1 in the Y direction.

Specifically, the first eccentric cam 7 is rotated in a clockwise direction to move the first adjustment plate 3A1 in a right direction in FIG. 2 against the pressing force of the spring 10. Further, the first eccentric cam 7 is rotated in a counterclockwise direction to move the first adjustment plate 3A1 in a left direction in FIG. 2 by the pressing force of the spring 10. Further, the second eccentric cam 8 and the third eccentric cam 9 are rotated to change a position of the first adjustment plate 3A1 in the Z direction.

Specifically, the second eccentric cam 8 and the third eccentric cam 9 are rotated in a clockwise direction to move the first adjustment plate 3A1 upward in FIG. 2 against the pressing force of the spring 10. Further, the second eccentric cam 8 and the third eccentric cam 9 are rotated in a counterclockwise direction to move the first adjustment plate 3A1 downward on FIG. 2 by the pressing force of the spring 10.

However, the liquid discharge apparatus may not include the springs 10 that press the pressed portion 31 downward from above. The first adjustment plate 3A1 may be configured to move downward by its own weight. Either one of the second eccentric cam 8 and the third eccentric cam 9 is rotated to vertically move either one side (one of left side or right side) of the first adjustment plate 3A1 in the Y direction. Thus, the rotation of one of the second eccentric cam 8 and the third eccentric cam 9 can tilt the first adjustment plate 3A1.

Figure 4:
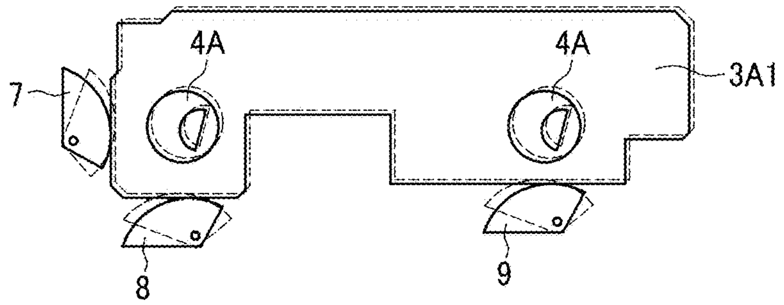
FIG. 4 is a side view of the first adjustment plate illustrating a movement of the first adjustment plate.

As illustrated in FIG. 4, the first eccentric cam 7, the second eccentric cam 8, and the third eccentric cam 9 are rotated in a counterclockwise direction to move the first adjustment plate 3A1 to a lower left direction in FIG. 4, as an example.

Figure 5:
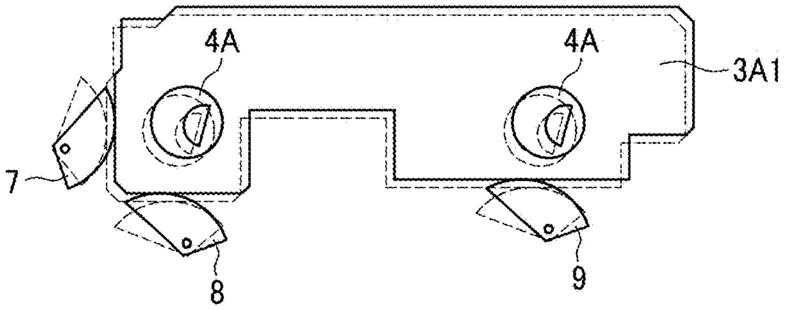
FIG. 5 is a side view of the first adjustment plate illustrating a movement of the first adjustment plate.

Further, as illustrated in FIG. 5, the first eccentric cam 7, the second eccentric cam 8, and the third eccentric cam 9 are rotated in a clockwise direction to move the first adjustment plate 3A1 to an upper right direction in FIG. 5.

Figure 6:
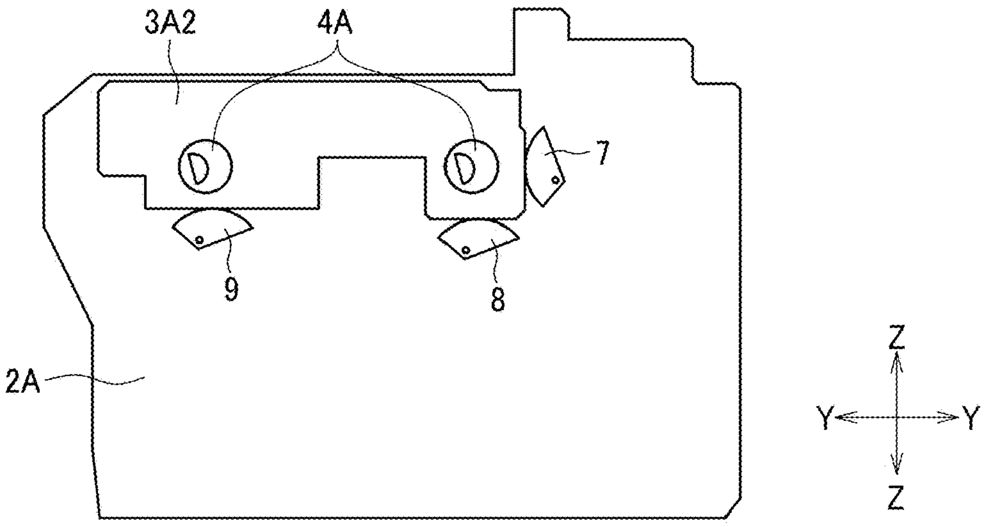
FIG. 6 is a side view of the first side plate illustrating a configuration of a right side of the first adjustment plate held by the first side plate.

As illustrated in FIG. 6, the first eccentric cam 7, the second eccentric cam, and the third eccentric cam 9 contact with the first adjustment plate 3A2 in the same manner as the first adjustment plate 3A1. The first adjustment plate 3A2 and eccentric cams of the first adjustment plate 3A2 are the same as the eccentric cams of the first adjustment plate 3A1 except that an arrangement in left and right directions of the eccentric cams are reversed.

Next, it is described below a method of changing a position of the first adjustment plate 3A using the eccentric cams to adjust the positions of the guide rod 4 and thus adjusting the position of the carriage 1. Following describes a case in which the first carriage 1A and the first guide rod 4A are misaligned (inclined) with respect to the main body 101 and the stage 51. Following further describes a case in which there is no positional deviation between the second carriage 1B and the second guide rod 4B. However, a position of the second adjustment plate 3B may be changed to adjust a position of the second carriage 1B and the second guide rod 4B. For simplicity, the carriage 1 is illustrated to have a rectangular parallelepiped shape in FIGS. 7, 9, and 10.

Figure 7:
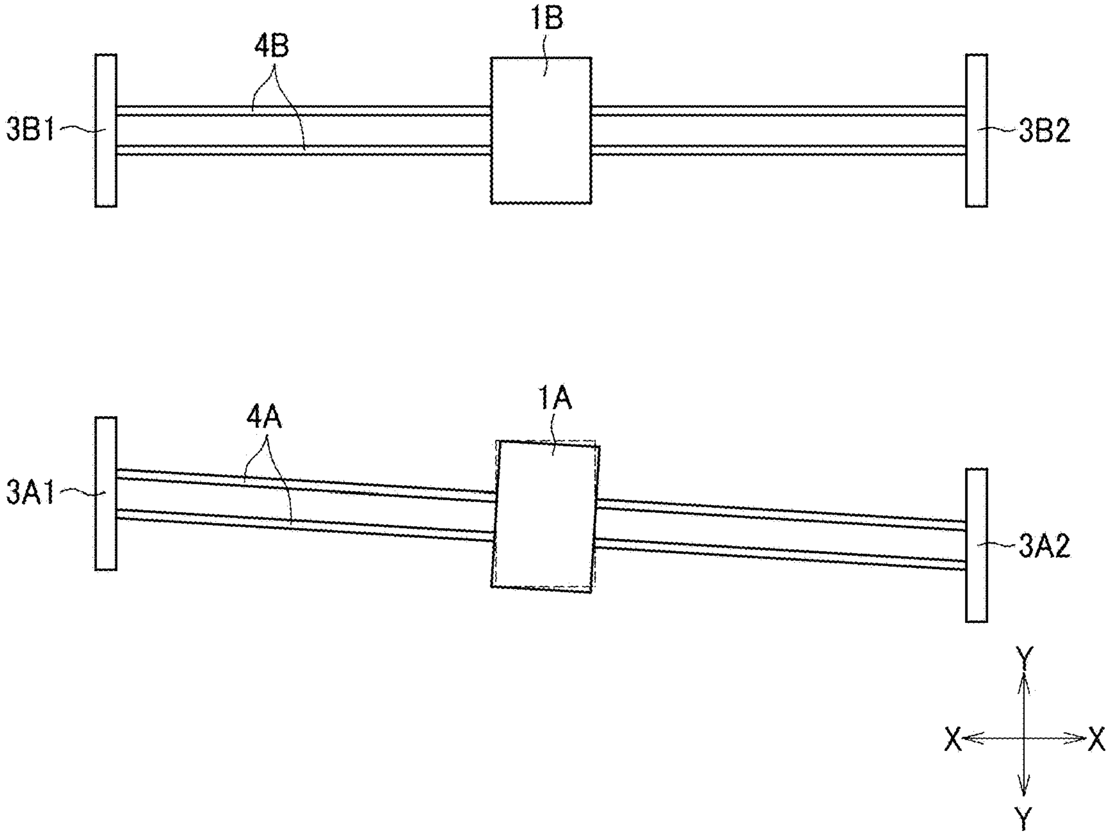
FIG. 7 is a plan view of a first carriage illustrating a state of a first carriage inclined in an X direction and a Y direction.

FIG. 7 is a plan view of the carriage 1 and the guide rods 4A or 4B viewed from above the liquid discharge apparatus 100. The first carriage 1A indicated by a dotted line in FIG. 7 is not inclined.

As illustrated in FIG. 7, the first guide rod 4A is inclined in the Y direction, and the parallelism between the first guide rod 4A and the second guide rod 4B is deteriorated. The first carriage 1A is inclined in the X direction and the Y direction due to an inclination of the first guide rod 4A. In other words, the first carriage 1A rotates in a direction along a X-Y plane. Further, a perpendicularity (squareness) of the first carriage 1A with respect to the conveyance direction of the fabric 900 (Y direction in FIG. 7) is deteriorated.

Figure 8:
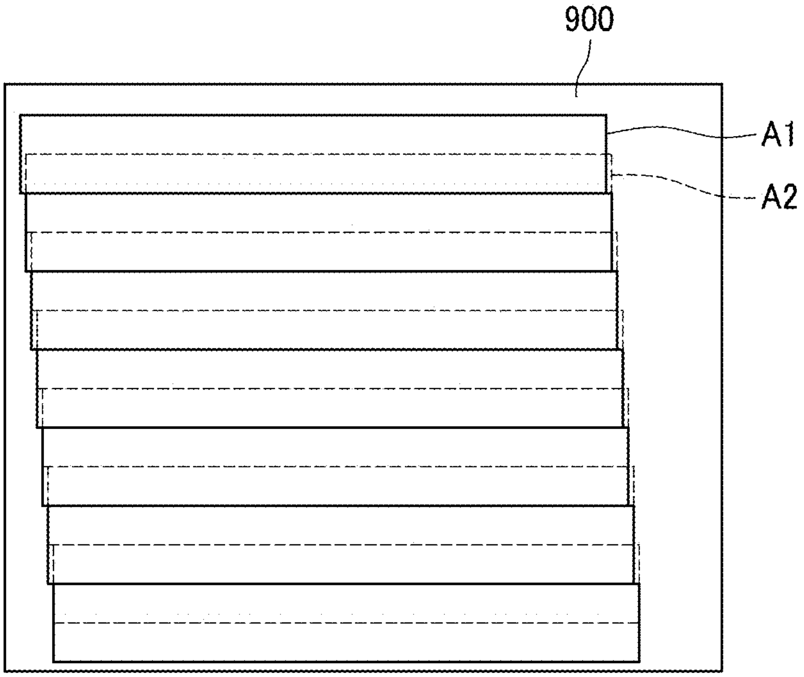
FIG. 8 is a plan view of a fabric illustrating a positional deviation of an image formed on the fabric due to an inclination of FIG. 7.

FIG. 8 is a plan view of the fabric 900 on which images are formed by the liquids discharged by the liquid discharge apparatus 100. FIG. 8 exaggeratingly illustrating a positional deviation of the image formed by the liquids discharged onto the fabric 900 in a state in which the positional deviation as illustrated in FIG. 7 occurs in the first guide rod 4A and the first carriage 1A.

In the above-described case, the first carriage 1A reciprocally moves in the main scanning direction (X direction) in an inclined state with respect to the fabric 900 as illustrated in FIG. 8. Therefore, an image A1 formed in a forward path (rightward direction) indicated by a solid line and an image A2 formed in a backward path (leftward direction) indicated by a dotted line are displaced from each other in the image formed on the fabric 900. Thus, an abnormal image is formed on the fabric 900.

When the positional deviation illustrated in FIG. 7 occurs, the first adjustment plate 3A1 is moved downward in FIG. 7 to correct the positional deviation of the first guide rod 4A and the first carriage 1A. Specifically, the first eccentric cam 7 illustrated in FIG. 2 is rotated clockwise to move the first adjustment plate 3A1 downward in FIG. 7 Alternatively, the first adjustment plate 3A2 is moved upward in FIG. 7. Specifically, the first eccentric cam 7 illustrated in FIG. 6 is rotated clockwise. Thus, the liquid discharge apparatus 100 can correct an inclination of the first guide rod 4A with respect to the main body 101 or the stage 51 and correct an inclination of the first carriage 1A. Further, the liquid discharge apparatus 100 can improve a parallelism between the first guide rod 4A and the second guide rod 48.

Figure 9:
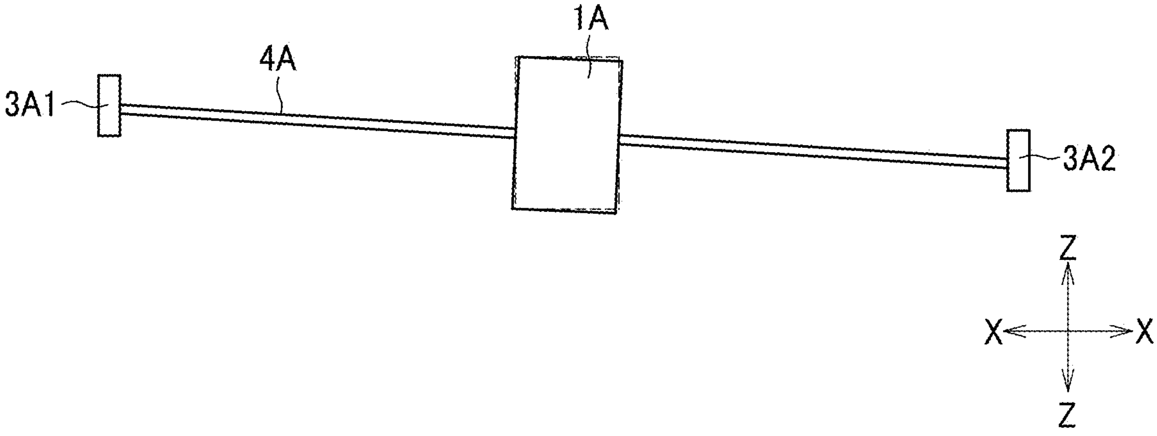
FIG. 9 is a plan view of the first carriage illustrating a state of the first carriage inclined in the X direction and a Z direction.

FIG. 9 is a front view of the carriage 1 and the guide rod 4 in which the liquid discharge apparatus 100 is viewed from a front of the liquid discharge apparatus 100. The first carriage 1A indicated by a dotted line in FIG. 9 is not inclined.

The first guide rod 4A illustrated in FIG. 9 is inclined in the Z direction. Thus, parallelism between the first guide rod 4A and the second guide rod 4B is deteriorated. The first carriage 1A is inclined in the X direction and the Z direction due to an inclination of the first guide rod 4A. In other words, the first carriage 1A rotates in a direction along an X-Z plane.

When the positional deviation illustrated in FIG. 9 occurs, the first adjustment plate 3A1 is moved downward in FIG. 9 to correct the positional deviation of the first guide rod 4A and the first carriage 1A. Specifically, the second eccentric cam 8 and the third eccentric cam 9 illustrated in FIG. 2 is rotated counterclockwise to move the first adjustment plate 3A1 downward in FIG. 9. Alternatively, the second eccentric cam 8 and the third eccentric cam 9 illustrated in FIG. 2 is rotated clockwise to move the first adjustment plate 3A2 upward in FIG. 9. Thus, the liquid discharge apparatus 100 can correct an inclination of the first guide rod 4A with respect to the main body 101 or the stage 51 and correct the inclination of the first carriage 1A. Further, the liquid discharge apparatus 100 can improve the parallelism between the first guide rod 4A and the second guide rod 4B.

Figure 10:
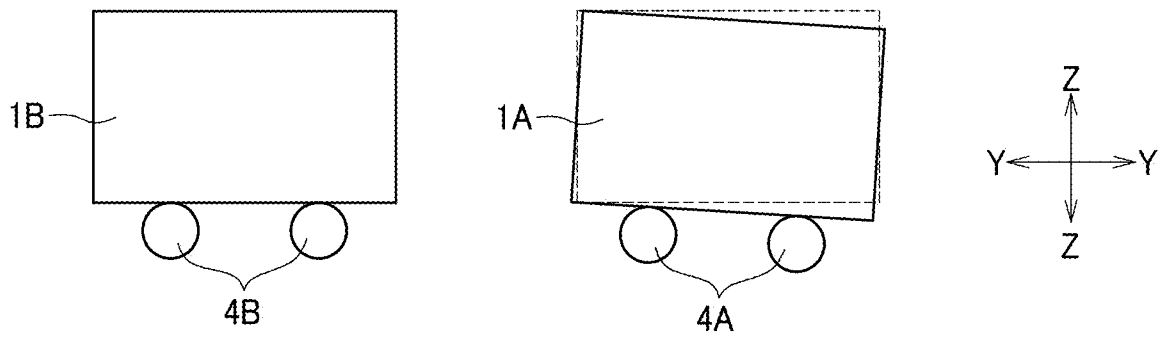
FIG. 10 is a side view of the carriage illustrating a state of the first carriage inclined in the Y direction and the Z direction.

FIG. 10 is a side view of an example of the carriage 1 illustrating the first carriage 1A and the second carriage 1B viewed from a left side of the liquid discharge apparatus 100. The first carriage 1A indicated by the dotted line in FIG. 10 is not inclined.

As illustrated in FIG. 10, one of (right side of) the first guide rods 4A is inclined in the Z direction (downward direction in FIG. 10) so that the parallelism between one of the first guide rod 4A and another of the first guide rod 4A is deteriorated. Accordingly, the first carriage 1A is inclined in the Y direction and the Z direction. In other words, the first carriage 1A rotates in a direction along a Y-Z plane. When such an inclination occurs, a difference in color occurs between one side and another side of the image formed on the fabric 900 in the Y direction.

In the above-described case, one of the first guide rod 4A disposed at left side in FIG. 10 is moved downward to correct the positional deviation of the first carriage 1A. Specifically, the second eccentric cam 8 illustrated in FIG. 2 is rotated counterclockwise to rotate the first adjustment plate 3A1 counterclockwise to move one (left side in FIG. 2) of the first guide rods 4A downward as illustrated in FIG. 10. Alternatively, the third eccentric cam 9 may be rotated clockwise to rotate the first adjustment plate 3A1 counterclockwise to move another (right side in FIG. 2) of the first guide rod 4A disposed on the right side in FIG. 10 is moved upward in FIG. 10. Thus, the liquid discharge apparatus 100 can correct an inclination of the first guide rod 4A with respect to the main body 101 or the stage 51 and correct the inclination of the first carriage 1A. Further, the liquid discharge apparatus 100 can improve the parallelism between one of the first guide rods 4A and another of the first guide rods 4A.

As described above, the liquid discharge apparatus 100 includes the second eccentric cam 8 and the third eccentric cam 9 that come into contact with the first adjustment plate 3A from the Z direction orthogonal to the Y direction. The second eccentric cam 8 and the third eccentric cam 9 are respectively disposed at one side (left side in FIG. 2) and another side (right side in FIG. 2) of the first adjustment plate 3A in the Y direction. Thus, the first carriage 1A can be rotated in a direction along the Y-Z plane.

The liquid discharge apparatus 100 as describe above corrects the inclination of the first guide rod 4A or the first carriage 1A with respect to the stage 51 or the main body 101 of the liquid discharge apparatus 100. The first guide rod 4A or the first carriage 1A may be respectively aligned with the second guide rod 4B or the second carriage 1B. Even when the positional deviations illustrated in FIGS. 7, 9, and 10 are combined, the liquid discharge apparatus 100 combines the rotations of the first eccentric cam 7, the second eccentric cam 8, and the third eccentric cam 9 to correct the positional deviations.

As described above, the liquid discharge apparatus 100 according to the present embodiment moves the adjustment plate 3 to correct the inclination of the guide rods 4 or the carriages 1 in the liquid discharge apparatus 100 or correct the inclination of the guide rods 4 or the carriages 1 with respect to the fabric 900 as the liquid application target. Further, the liquid discharge apparatus 100 can improve the parallelism between the guide rods 4 with each other or between the carriages 1 with each other. Therefore, the liquid discharge apparatus 100 can accurately discharge the liquid to a predetermined position on the fabric 900. That is, the liquid discharge apparatus 100 can form an image on the fabric 900 with high positional accuracy.

As described above, the liquid discharge apparatus 100 according to the present embodiment moves the adjustment plate 3 as a holder to at least one of the Y direction or the Z direction to adjust positions of the guide rods 4 or the carriages 1. A movement of the adjustment plate 3 to at least one of the Y direction or the Z direction means a movement of the adjustment plate 3 to at least one of the conveyance direction of the liquid application target (fabric 900) or a direction perpendicular to the placement surface 51*a* of the liquid application target (fabric 900) of the stage 51.

Specifically, the liquid discharge apparatus 100 can correct the inclination of the guide rods 4 or the carriages 1 in the liquid discharge apparatus 100. The liquid discharge apparatus 100 can correct the inclination of the guide rods 4 or the carriages 1 with respect to the fabric 900 as the liquid application target or the stage 51. Further, the liquid discharge apparatus 100 can improve the parallelism between the guide rods 4 with each other or between the carriages 1 with each other.

Therefore, the liquid discharge apparatus 100 can discharge the liquid to a predetermined position on the fabric 900 with high accuracy, and can form an image on the fabric 900 with high positional accuracy.

This "moving direction in at least one of the conveyance direction of the liquid application target (fabric 900) and the direction perpendicular to the placement surface 51*a* of the liquid application target (fabric 900) on the stage 51" is a moving direction in the Y direction or the Z direction perpendicular to the X direction as the main scanning direction in the present embodiment. However, the moving direction is not strictly limited to a direction perpendicular to the main scanning direction (X direction), and the moving direction may be sightly inclined with respect to the direction perpendicular to the main scanning direction (X direction).

This "moving direciton of the holder in at least one of the conveyance direction of the liquid application target (fabric 900) and the direction perpendicular to the placement surface 51*a* of the liquid application target (fabric 900) on the stage 51" is not strictly limited to a moving direction parallel to a conveyance direction (Y direction) of the liquid application target (fabric 900).

This "moving direction of the holder" is also not strictly limited to a direction parallel to a direction perpendicular to the placement surface 51*a* of the liquid application target (fabric 900) on the stage 51. The "moving direction of the holder" may be sightly inclined with respect to the direction parallel to the conveyance direction (Y direction) of the liquid application target (fabric 900). A moving direction of the holder includes a moving direction only in the Y direction, a moving direction only in the Z direction, and a moving direction having vectors in both the Y direction and the Z direction.

Further, the liquid discharge apparatus 100 may print an adjustment image on the fabric 900 and use the adjustment image to adjust the positions of the guide rods 4 or the carriages 1. The adjustment image may have a line portion parallel to at least one of the main scanning direction (X direction) and the sub scanning direction (Y direction).

Further, the adjustment image may include an image formed in each of the forward path and the backward path of the carriage 1. The adjustment image may include an image by each of carriages 1 only. Specifically, the adjustment image may include adjustment images each having an image using only a color corresponding to each carriage 1.

The adjustment image may have images each corresponding to the printing ranges of the respective carriages 1. However, the user may move the adjustment plate 3 while visually checking the position of the adjustment plate 3 to correct the inclination of the carriages 1 or the guide rods 4.

Although the preferred embodiments of the present disclosure have been described above, the present disclosure is not limited to the embodiments described above, and a variety of modifications can naturally be made within the scope of the present disclosure.

The above describes a case in which the liquid discharge apparatus 100 includes the first eccentric cam 7, the second eccentric cam 8, and the third eccentric cam 9 as a mechanism to change the position of the adjustment plate 3, as an example. However, the liquid discharge apparatus 100 does not have to include all of the first eccentric cam 7, the second eccentric cam 8, and the third eccentric cam 9. For example, the first eccentric cam 7 may be omitted in a case in which the adjustment plate 3 does not have to be moved in the Y direction such that a positional accuracy of the carriage 1 and the guide rod 4 in the Y direction is ensured. Either one or both of the second eccentric cam 8 and the third eccentric cam 9 may be omitted.

In the above description, the guide rod 4 is illustrated as a guide to move the carriage 1 in the main scanning direction (X direction), but the present embodiment is not limited to the guide rod 4. For example, the liquid discharge apparatus 100 may include a rail to move the carriage 1 in the main scanning direction (X direction) as the guide. Further, the shape of the holder is not limited to a plate shape.

Figure 11:
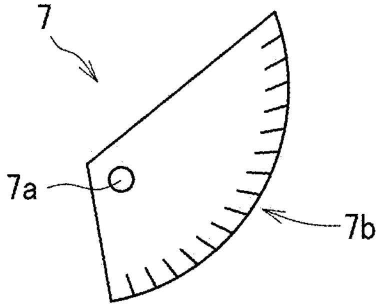
FIG. 11 is a front view of an eccentric cam having a scale.

Further, as illustrated in FIG. 11, the first eccentric cam 7 may have a scale 7*b* along a rotational direction of the first eccentric cam 7. The scale 7*b* makes it easier for the user to change the position of the adjustment plate 3 while visually checking the position of the adjustment plate 3 to adjust the positions of the guide rods 4 and the carriages 1. Although the first eccentric cam 7 is illustrated in FIG. 11 as an example, a scale may be provided on the second eccentric cam 8 or the third eccentric cam 9.

In the above description, the liquid discharge apparatus includes multiple carriages. However, the liquid discharge apparatus may include single carriage.

In the above-described embodiment, the fabric is used as an example of a liquid application target. However, the liquid application target is not limited to the fabric, and may be any target to which the liquid can adhere.

The term "liquid discharge apparatus" used herein also represents an apparatus including the carriage including the head to drive the bead to discharge a liquid. The term "liquid discharge apparatus" used here includes, in addition to apparatuses to discharge liquid to materials on which the liquid can adhere, apparatuses to discharge the liquid into gas (air) or liquid.

The "liquid discharge apparatus" may include devices to feed, convey, and eject the material on which liquid can adhere. The liquid discharge apparatus may further include a pretreatment apparatus to coat a treatment liquid onto the material, and a post-treatment apparatus to coat a treatment liquid onto the material, onto which the liquid has been discharged.

The "liquid discharge apparatus" may be, for example, an image forming apparatus to form an image on a sheet by discharging ink, or a three-dimensional fabrication apparatus to discharge a fabrication liquid to a powder layer in which powder material is formed in layers to form a three-dimensional fabrication object.

The term "liquid discharge apparatus" is not limited to an apparatus to discharge liquid to visualize meaningful images, such as letters or figures. For example, the liquid discharge apparatus may be an apparatus to form arbitrary images, such as arbitrary patterns, or fabricate three-dimensional images.

The above-described term "material onto which liquid can adhere" represents a material on which liquid is at least temporarily adhered, a material on which liquid is adhered and fixed, or a material into which liquid is adhered to permeate. Examples of the "material on which liquid can adhere" include recording media, such as paper sheet, recording paper, recording sheet of paper, film, and cloth, electronic component, such as electronic substrate and piezoelectric element, and media, such as powder layer, organ model, and testing cell. The "material on which liquid can adhere" includes any material on which liquid can adhere, unless particularly limited.

Examples of the "material onto which liquid can adhere" include any materials on which liquid can adhere even temporarily, such as paper, thread, fiber, fabric, leather, metal, plastic, glass, wood, and ceramic.

Aspects of the present invention are, for example, as follows.

[Aspect 1]

A liquid discharge apparatus includes a carriage having a liquid discharge head; one or more guides to movably hold the carriage in a main scanning direction; and a pair of holders respectively holding both ends of the one or more guides in the main scanning direction; multiple eccentric cams each contacting the pair of holders; and a stage configured to hold a liquid application target.

The liquid discharge apparatus rotates the multiple eccentric cams to move the pair of holders to at least one of a conveyance direction of the liquid application target and a direction perpendicular to a placement surface of the liquid application target on the stage to adjust a position of the carriage or the one or more guides.

[Aspect 2]

The liquid discharge apparatus according to Aspect 1, further includes one or more guides respectively corresponding to one or more carriages; the pair of holders; and the multiple eccentric cams.

[Aspect 3]

The liquid discharge apparatus according to Aspect 1 or Aspect 2, wherein the eccentric cam contacts with the holder from a front and rear direction of the liquid discharge apparatus.

[Aspect 4]

The liquid discharge apparatus according to any one of Aspect 1 to Aspect 3, wherein the multiple eccentric cams contact with the pair of holders from a vertical direction of the liquid discharge apparatus.

[Aspect 5]

The liquid discharge apparatus according to Aspect 4, wherein the multiple eccentric cams contact with each of one side and another side of the pair of holders in a front and rear direction of the liquid discharge apparatus from the vertical direction of the liquid discharge apparatus.

[Aspect 6]

The liquid discharge apparatus according to any one of Aspect 1 to 5, farther includes springs that presses the holders toward the eccentric cams.

[Aspect 7]

The liquid discharge apparatus according to any one of Aspects 1 to 6, wherein at least one of the multiple eccentric cams have a scale along a rotation direction of the multiple eccentric cams.

[Aspect 8]

The liquid discharge apparatus according to any one of Aspect 1 to 7, wherein the liquid discharge head can form an at image on the liquid application target, and the position of the carriage is adjusted based OP the adjustment image formed on the liquid application target.

The liquid discharge apparatus according to the above described embodiments can adjust positions of the carriages and the guides.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge apparatus comprising:
- a liquid discharge head configured to discharge a liquid in a discharge direction onto a liquid application target;
- a stage configured to hold and move the liquid application target in a conveyance direction orthogonal to the discharge direction,
- a carriage on which the liquid discharge head is mounted;
- a guide holding the carriage movable in a main scanning direction orthogonal to each of the discharge direction and the conveyance direction;
- a pair of holders respectively holding sides of the guide in the main scanning direction; and
- multiple eccentric cams contacting each of the pair of holders, the multiple eccentric cams rotatable to move at least one of the pair of holders in at least one of the conveyance direction or the discharge direction to adjust a position of the carriage or the guide.

2. The liquid discharge apparatus according to claim 1, wherein
- the carriage includes multiple carriages; and
- the guide includes multiple guides corresponding to the multiple carriages.

3. The liquid discharge apparatus according to claim 1, wherein at least one of the multiple eccentric cams contact the pair of holders in the conveyance direction orthogonal to the discharge direction.

4. The liquid discharge apparatus according to claim 1, wherein the multiple eccentric cams contact each of the pair of holders in the discharge direction.

5. The liquid discharge apparatus according to claim 4, wherein the multiple eccentric cams contact each of the pair of holders in the discharge direction at positions different in the conveyance direction orthogonal to the discharge direction.

6. The liquid discharge apparatus according to claim 1, further comprising:
- multiple springs configured to press the pair of holders toward directions opposite to contact directions of the multiple eccentric cams with the pair of holders.

7. The liquid discharge apparatus according to claim 1, wherein at least one of the multiple eccentric cams has a scale along a rotational direction of said one of the multiple eccentric cams.

8. The liquid discharge apparatus according to claim 1, wherein
- the liquid discharge head discharges the liquid onto the liquid application target to form an adjustment image on the liquid application target, and
- a position of the carriage is adjusted based on the adjustment image on the liquid application target.

9. The liquid discharge apparatus according to claim 1, wherein the multiple eccentric cams include:
- a first eccentric cam contacting one of the pair of holders in the conveyance direction orthogonal to the discharge direction, and
- a second eccentric contacting another of the pair of holders in the conveyance direction orthogonal to the discharge direction.

10. The liquid discharge apparatus according to claim 1, wherein the multiple eccentric cams include:
- a first eccentric cam contacting one of the pair of holders in the discharge direction,
- a second eccentric cam contacting the one of the pair of holders in the discharge direction,
- a third eccentric cam contacting another of the pair of holders in the discharge direction, and
- a fourth eccentric cam contacting the other of the pair of holders in the discharge direction.

11. The liquid discharge apparatus according to claim 9, wherein the multiple eccentric cams include:
- a third eccentric cam contacting the one of the pair of holders in the discharge direction,
- a fourth eccentric cam contacting the one of the pair of holders in the discharge direction,
- a fifth eccentric cam contacting the other of the pair of holders in the discharge direction, and
- a sixth eccentric cam contacting the other of the pair of holders in the discharge direction.

12. The liquid discharge apparatus according to claim 10, wherein
- the first and the second eccentric cams contact the one of the pair of holders in the discharge direction at positions different in the conveyance direction orthogonal to the discharge direction, and
- the third and the fourth eccentric cams contact the other of the pair of holders in the discharge direction at positions different in the conveyance direction orthogonal to the discharge direction.

13. The liquid discharge apparatus according to claim 11, wherein
- the third and the fourth eccentric cams contact the one of the pair of holders in the discharge direction at positions different in the conveyance direction orthogonal to the discharge direction, and
- the fifth and the sixth eccentric cams contact the other of the pair of holders in the discharge direction at positions different in the conveyance direction orthogonal to the discharge direction.

14. The liquid discharge apparatus according to claim 9, further comprising:
- a first spring configured to press the one of the pair of holders toward a direction opposite to a contact direction of the first eccentric cam with the one of the pair of holders, and
- a second spring configured to press the other of the pair of holders toward a direction opposite to a contact direction of the second eccentric cam with the other of the pair of holders.

15. The liquid discharge apparatus according to claim 10, further comprising:
- a first spring configured to press the one of the pair of holders toward a direction opposite to a contact direction of the first eccentric cam with the one of the pair of holders,
- a second spring configured to press the one of the pair of holders toward a direction opposite to a contact direction of the second eccentric cam with the one of the pair of holders,
- a third spring configured to press the other of the pair of holders toward a direction opposite to a contact direction of the third eccentric cam with the other of the pair of holders, and
- a fourth spring configured to press the other of the pair of holders toward a direction opposite to a contact direction of the fourth eccentric cam with the other of the pair of holders.

16. The liquid discharge apparatus according to claim 11, further comprising:
- a third spring configured to press the one of the pair of holders toward a direction opposite to a contact direction of the third eccentric cam with the one of the pair of holders, a fourth spring configured to press the one of the pair of holders toward a direction opposite to a contact direction of the fourth eccentric cam with the one of the pair of holders, a fifth spring configured to press the other of the pair of holders toward a direction opposite to a contact direction of the fifth eccentric cam with the other of the pair of holders, and a sixth spring configured to press the other of the pair of holders toward a direction opposite to a contact direction of the sixth eccentric cam with the other of the pair of holders.

17. The liquid discharge apparatus according to claim 12, further comprising:

a first spring configured to press the one of the pair of holders toward a direction opposite to a contact direction of the first eccentric cam with the one of the pair of holders, a second spring configured to press the one of the pair of holders toward a direction opposite to a contact direction of the second eccentric cam with the one of the pair of holders, a third spring configured to press the other of the pair of holders toward a direction opposite to a contact direction of the third eccentric cam with the other of the pair of holders, and a fourth spring configured to press the other of the pair of holders toward a direction opposite to a contact direction of the fourth eccentric cam with the other of the pair of holders.

18. The liquid discharge apparatus according to claim 13, further comprising:

a third spring configured to press the one of the pair of holders toward a direction opposite to a contact direction of the third eccentric cam with the one of the pair of holders, a fourth spring configured to press the one of the pair of holders toward a direction opposite to a contact direction of the fourth eccentric cam with the one of the pair of holders, a fifth spring configured to press the other of the pair of holders toward a direction opposite to a contact direction of the fifth eccentric cam with the other of the pair of holders, and a sixth spring configured to press the other of the pair of holders toward a direction opposite to a contact direction of the sixth eccentric cam with the other of the pair of holders.

* * * * *